United States Patent [19]

Palasz

[11] Patent Number: 5,077,379
[45] Date of Patent: Dec. 31, 1991

[54] COATING COMPOSITIONS BASED ON UNSATURATED POLYESTER, LATENT POLYAMINE AND CYCLIC KETONE

[75] Inventor: Peter D. Palasz, Taplow, England

[73] Assignee: ICI PLC, London, England

[21] Appl. No.: 411,018

[22] Filed: Sep. 22, 1989

[30] Foreign Application Priority Data

Sep. 30, 1988 [GB] United Kingdom ................ 8823071

[51] Int. Cl.$^5$ ...................... C08G 63/44; C08G 69/44
[52] U.S. Cl. ...................... 528/288; 528/99; 528/125; 528/128; 528/183; 528/199; 528/293; 528/295.5; 528/297; 528/306; 525/437; 525/438; 525/440; 525/444.5; 525/447
[58] Field of Search ................ 528/288, 99, 125, 128, 528/183, 199, 293, 295.5, 297, 306; 525/437, 438, 440, 444.5, 447

[56] References Cited

U.S. PATENT DOCUMENTS 4,042,646  8/1977  Edamura et al. ................ 525/49
4,730,033  3/1988  Horley et al. ................ 525/447

Primary Examiner—John Kight, III
Assistant Examiner—Frederick Krass
Attorney, Agent, or Firm—Thomas M. Schmitz

[57] ABSTRACT

A curable coating composition which comprises
a) a condensation polymer in which the backbone contains activated unsaturated groupings.
b) a compound containing at least three blocked primary amino groups
c) a cyclic ketone of formula

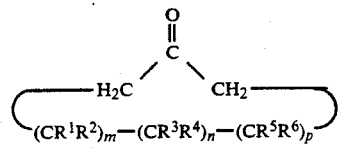

in which $R^1$ to $R^6$ are any non-interfering groups.

11 Claims, 6 Drawing Sheets

RESULTS OF OVERNIGHT CURE

COATING COMPOSITIONS BASED ON UNSATURATED POLYESTER, LATENT POLYAMINE AND CYCLIC KETONE

This invention relates to coating compositions that are capable of being cured at ambient temperatures. In particular, it relates to improvements in such compositions which contain an unsaturated condensation polymer of specified structure together with a compound carrying amine groups of a specified type.

In U.K. published patent specification no. GB 2166749A there are disclosed coating compositions having the property of curing at or near room temperature made by bringing together a condensation polymer containing activated double bonds in the polymer backbone and a compound carrying at least three primary amino groups which can be in latent form (i.e. blocked with e.g. ketones or aldehydes).

We have now found that a surprising improvement in the speed of cure of such compositions can be made by the addition to such compositions of certain carbonyl compounds.

According to the present invention there is provided a curable coating composition comprising:

(a) a condensation polymer in which the polymer backbone of each molecule on average contains at least one activated unsaturated grouping of the formula (1),

where R and $R^7$ are the same or different and are hydrogen, a halogen or an alkyl or aryl group:

(b) a compound containing at least three primary amino groups, that are in latent form and (c) a cyclic ketone of formula (2) where the sum of "m" "n" and "p" is from 2-5, and $R^1$ to $R^6$ are any groups which do not react with components, (a) or (b) of the composition,

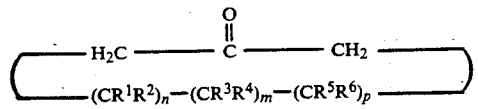

Condensation polymers suitable as component (a) of the compositions include in particular polyesters which are obtained in known manner by reacting a dicarboxylic acid of the formula (3):

or an ester-forming derivative thereof, with one or more polyols.

Particularly suitable dicarboxylic acids of formula (3) are maleic acid and fumaric acid; suitable ester-forming derivatives of these include the corresponding $C_{1-6}$ alkyl, for example methyl or ethyl, esters and, in the case of maleic acid, the corresponding anhydride.

In addition to the unsaturated dicarboxylic acid of the formula (3), the reactants from which the polyester is made can also include one or more other carboxylic acids, for example saturated aliphatic dicarboxylic acids particularly succinic acid, glutaric acid, adipic acid and sebacic acid, and aromatic polycarboxylic acids particularly phthalic acid, isophthalic acid, terephthalic and trimellitic acid. Ester-forming derivatives of such acids, in particular anhydride derivatives for example phthalic anhydride, can be used in place of the free acids.

The relative proportions used of the dicarboxylic acid (3) and of any other polycarboxylic acid should, however, be chosen so that the above-defined requirement of an average of at least one residue of the dicarboxylic acid (3) per polyester molecule is satisfied. In practical terms, this means that normally at least 20%, and preferably at least 50% of the ester linkages in the polymer backbone of the polyester should be derived from the dicarboxylic acid (3).

Suitable polyols include diols for example ethylene glycol, propylene glycol, propane 1,3-diol, butylene glycol, butane 1,4-diol, hexane 1,6-diol, neopentyl glycol, diols obtained by reaction of bisphenol-A with alkylene oxides; triols for example glycerol, trimethylolpropane, trimethylolethane, hexane 1,2,6-triol; tetrols for example pentaerythritol and higher polyols for example sorbitol. Mixtures of any two or more of these polyols may be employed.

Particularly suitable diols are those obtained by reaction of bisphenol-A with ethylene or propylene oxides (commercially available as Dianol 22 (trade mark) or Dianol 33 (trade mark), respectively, from Akzo Chimie).

In place of, or in addition to, a polyol, there can be reacted with the dicarboxylic acid a compound containing two or more epoxy groups, for example an epoxy resin of the type obtained by reacting bisphenol-A with epichlorhydrin. In this case, the resulting polyester contains a hydroxyl group immediately adjacent to each ester grouping in which the residue of the epoxy compound participates.

The overall proportion of total hydroxyl group-bearing reactants to total carboxyl group-bearing reactants may be varied in accordance with principles well understood in the polyester art; usually a slight to moderate excess of the polyol reactants will be employed so as to produce a polyester of low acid value. Also, the relative proportions of reactants of functionality (with respect to either hydroxyl or carboxyl groups) greater than two will be regulated, again as well known in the art, in order to avoid the production of gelled material. Conventional reaction temperatures, e.g. in the range 100° C. to 300° C. can be used and the reaction can be carried out in the presence of a solvent, particularly one, for example xylene, that is capable of forming an azeotrope with the water produced during the reaction.

In the term "polyester" we include also urethane-ester polymers satisfying the above definition. Such polymers can be made by reacting a dicarboxylic acid (3), one or more polyols and a polyisocyanate, optionally together with one or more of the other polycarboxylic acids mentioned above.

In these polymers, the polyisocyanate effectively takes the place of all or part of the other polycarboxylic acid, and is considered as equivalent thereto when selecting the relative proportions of the reactants from which the urethane-ester polymer is derived. Suitable polyisocyanates include tolylene diisocyanate, hexamethylene diisccyanate, isophorone diisocyanate, diphenylmethane diisocyanate and xylene diisocyanate.

In making the urethane-ester polymer, all the starting materials, including the polyisocyanate, can be reacted together in the normal way as for conventional polyester preparation. Alternatively, all the starting materials except the polyisocyanate may be reacted together in a first step to form a "base" polyester of high hydroxyl value, following which a proportion of the hydroxyl groups in the latter reacted with the polyisocyanate.

In both the polyesters and the urethane-ester polymers mentioned above, can opticnally contain present autoxidisable groupings derived from drying oil or semi-drying oil fatty acids, such acids having been included in the starting materials from which the polymers are made. Suitable acids include the fatty acids, from linseed oil, soya bean oil, tall oil, sunflower oil, safflower oil and rapeseed oil.

The resulting alkyd or urethane alkyds exhibit, in addition to the initial rapid cure brought about by the reaction with the component (b) of the compositions of the invention, a further, slower oxidative cure step involving atmospheric oxygen as occurs in conventional air-drying coating compositions.

The component (b) of the compositions is a compound carrying at least three primary amino groups wherein they are present in latent form. By "latent form" we mean that each primary amino group in question is in the form of a derivative that is capable of reverting to a primary amino group under the conditions to which the composition is exposed in order to bring about curing. However, in the case of the present invention, it is essential that the derivative must be one other than that of a cyclic ketone of formula (2).

Compounds that are useful as precursors for the components (b) include those of the aliphatic, cyclo-aliphatic and aromatic series containing three or more primary amino groups, which are in latent form. Examples of such pre-blocked compounds include tris-(2-aminoethyl) amine, $N(CH_2CH_2NH_2)_3$, and the products of the "Jeffamine" series (Registered Trade Mark) manufactured by Jefferson Chemical Co. and having the general structure:

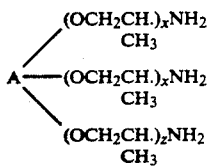

Compounds useful as component (b) are those in which the three primary amino groups are blocked by condensation of primary amino group with a $C_{1-6}$ alkanone for example acetone, methyl ethyl ketone, methyl isobutyl ketone, or with a $C_{1-6}$ aldehyde for example acetaldehyde or propionaldehyde. In this way, the primary amino group is converted to a grouping of the formula:

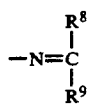

where $R^8$ is a $C_{1-6}$ alkyl group and R is hydrogen or a $C_{1-6}$ alkyl group. Any of the blocked primary amino group are hydrolysable back to the corresponding free groups in the presence of water.

Suitable compounds containing three or more primary amino groups may be made by joining together molecules containing less than three such groups but containing other functional groups such as secondary amino groups or hydroxyl groups. Where the primary amino groups are blocked by ketimine or aldimine formation as mentioned above, the other functional groups can then be linked together through a polyfunctional co-reactant for example a polyisocyanate or a polyepoxide.

Thus, diethylene triamine can be converted to the bis-ketimine by reaction with methyl isobutyl or iso-amyl ketone, then condensed via the remaining free secondary amino group with a polyisocyanate or a polyepoxide. The resulting condensation product contains at least four latent primary amino groups and it can be used directly as the component (b). In forming the condensation product, it may be desirable to use an excess of the polyisocyanate or polyepoxide in order to ensure complete reaction of the ketimine; the condensation step can be followed immediately by reaction of the product with a $C_{1-6}$ alkanol for example butanol in order to eliminate any residual free isocyanate or epoxide groups.

Various other ways of producing suitable highly functional components as precursors to component (b) will be apparent to those skilled in the art. For example, 3 molar proportions of a di-primary amine such as 1,6-hexanediamine can be reacted with 1 molar proportion of a $C_{1-6}$ alkanol ester of maleic acid, such as dimethyl maleate; the first molecule of the diamine undergoes addition to the double bond in the ester and the other two molecules effect aminolysis of the ester groups, resulting in the production of a triprimary amine which is then subjected to a suitable blocking reaction as mentioned above.

The more complex types of amine component (b) which have been described are in general to be preferred to the simpler types because of their lower volatility, and lower toxicity. However, the suitability of any polyamine in a particular case can be established readily by experiment.

In the compositions of the invention, the unsaturated condensation polymer component (a) and the amine (b) are normally reacted together in such proportions as to provide approximately one latent amino group for each double bond present. It is preferred to use at least about 0.5 amine groups for each double bond.

The cyclic ketones of formula (2) are unsubstituted in the positions alpha to the carbonyl group (e.g. in positions 2 and 5 for cyclohexanone). These ketones also do not have a double bond in conjugation with the carbonyl group.

Optionally they can be substituted in the other positions in the ring with one or more groups $R^1$ to $R^6$ which do not react with either the amine component (b) or the unsaturated polyester component (a) in any of the other positions in the ring.

In practice the ketone has no more than one substituent. Thus one of $R^1$ to $R^6$ is $C_{1-6}$ alkyl and the remainder are hydrogen. Such substituents can be, for example: $C_{1-6}$ alkyl. Examples of $C_{1-6}$ alkyl groups for $R^1$ to $R^6$ are methyl, ethyl, n- and iso-propyl. n-, iso-and t-butyl, n-pentyl and n-hexyl.

Examples of compounds of formula (2) include cyclopentanone, cyclohexanone, cycloheptanone, cyclooctanone, 4-methyl cyclohexanone 3-methyl cyclohexanone and 4-t-butyl cyclohexanone. Preferred ketones are those with 6 carbon atoms in the ring. A particularly preferred ketone is cylcohexanone.

The cyclic ketone of formula (2) is preferably present in an amount in excess of 0.25 moles per mole of blocked amino group from the component (b). A preferred range for the amount of cyclic ketone present is 0.25 to 16, more preferably 0.5 to 4 moles per mole of blocked amine group from the component (b). Most preferably it is present in an amount of from two to three moles per mole of blocked amine group from component (b), especially two moles.

The compositions optionally contain, in addition to the components (a), (b) and (c), one or more pigments and/or fillers and one or more solvents such as are conventionally employed in the coatings art for example xylene, ethyl acetate, butyl acetate, methyl isobutyl ketone, propylene glycol monomethylether and propylene glycol monomethylether acetate.

They can also contain other conventional paint additives such as fillers, plasticisers, flow control agents and UV absorbers.

The compositions of the invention can be prepared by bringing together the components (a) to (c) as above with any optional additives as described above.

The coating compositions can, in principle, be formulated as either "two-pack" or "one-pack", depending on component (b). Where the component contains latent primary amino groups that are readily hydrolysed, the scope for formulating one-pack compositions might, in practice, be limited to clear, un-pigmented compositions because it is very difficult to obtain pigments in a completely moisture-free condition.

A typical one-pack formulation according to the present invention contains a mixture of a resin according to component (a), an amine hardener according to component (b), solvent and pigment and the component (c) optionally in admixture with solvent or thinner. A typical "two-pack" formulation according to the present invention contains a mixture of a resin according to component (a), optionally solvent and pigment; an amine hardener according to component (b); and solvent or thinner; and a cyclic ketone component (c) in admixture with either the pigment or the solvent/thinner.

The present compositions are of particular interest in two-pack, pigmented form for use as undercoats in the automobile refinish, aircraft and marine trades, where there is little or no possibility of heat being applied in order to cure the coating. Such undercoat compositions can be either of the primer/surfacer type, to be applied to the substrate in a relatively thin film as preparation for the subsequent application of topcoat or of the primer/filler type which is more thickly applied and is capable of levelling out small surface irregularities and imperfections in the substrate.

The compositions are however, applicable to a wide variety of other substrates, including other metal structures and articles such as domestic equipment, and articles made of wood and plastics.

The compositions of the present invention can be applied to target objects by standard methods for example by spraying, brushing, dipping or curtain coating. The composition is applied as a film and allowed to cure.

When applied to the substrate under normal conditions of temperature and humidity, the compositions achieve a resistance to rubbing with a methyl ethyl ketone-soaked rag ("M.E.K. rubs") and a hardness as measured by an Erichsen Pendulum Hardness meter which is significantly higher than that of compositions which do not contain the cyclic ketone of formula (2). In the context of their use as undercoats for automobile re-finishing, as already mentioned, the compositions possess the advantage of giving films having excellent resistance to attack by petrol or solvents, and excellent hardness in a shorter time than that previously achievable with such compositions. A further advantage is that they are able to accept overcoating after a very short curing period.

The invention is illustrated by the following Examples in which parts are by weight.

EXAMPLES

Examples 1-8: Preparation of Compositions (a). Polyester Preparation—Component (a)

A mixture of trimethylol propane (15.1 parts) 'Dianol' 33 (578.4 parts), (ex Akzo Chemie, 'Dianol' is a Registered Trade Mark) maleic anhydride (170.4 parts) and xylene (15.3 parts), was reacted together until the acid value had fallen to 18 mg. of KOH per gram of non-volatile material.

The product was then diluted to a non-volatile content of 50% with a mixture of xylene and propylene glycol monomethyl ether at a calculated ratio to result in the product Containing xylene and propylene glycol monomethyl ether at a ratio of 1:1.

Dianol 33 is believed to have the following structure:

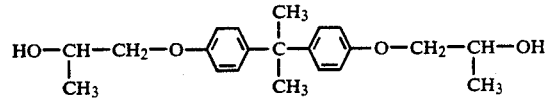

(b) Polyamine Preparation—Component (b)

1) Epoxy amine Preparation

A mixture of butyl acetate (337.1 g) and 'Synprolam' 35N3, a synthetic fatty amine (185.5 g) ('Synprolam' is a trade name of Imperial Chemical Industries PLC) was added to a refluxing mixture of 'Epikote' 880 (1500 g), ('Epikote' is a trade name of Shell), toluene (1011.3 g) and propylene glycol monomethyl ether (337.1 g) over a period of 30 minutes. The temperature was maintained at reflux until the epoxy value had fallen to 1.79 millimoles/g.

2) Diketimine Preparation

A mixture of diethylene triamine (395.8 g) and methyl isobutyl ketone (2742.11 g) was heated to reflux. The temperature was maintained at reflux until all the water produced during the reaction had been collected (137.0 g).

3) Polyamine Preparation

The epoxy amine as prepared in 1 above (2800 g) was added to a refluxing mixture of toluene (930.2 g) and diketimine as prepared in 2 above, (3174.8 g) over a period of 30 minutes. The temperature was maintained at reflux until the epoxy value had fallen to 0.15 millimoles/g.

(c) Coating Composition

A mixture of the polyamine as prepared in (b) above (23 g), acetone (2.42 g) and cyclohexanone (2.03 g) was added to a paint pack (100 g) comprising pigments (Tio2, BaSO4, talc, an anticorrosive pigment and Fe2O3)

and, to a pigment volume concentration (PVC) of 50%, unsaturated polyester prepared in (a) above.

The viscosity of the resulting composition was then adjusted to 21 seconds as measured in a British Standard B4 viscosity cup, using a solvent mixture comprising butyl acetate, methyl propoxol acetate and a high boiling aromatic hydrocarbon "Solvesso" 100 at a ratio of 80:15:05.

(d). Polyester Preparation—Component (d)

A mixture of trimellitic anhydride (19.8 g), Dianol 33 (516.0 g), and maleic anhydride (123.6 g) was reacted together until the acid value had fallen to 15 mg. of KOH per gram non-volatile.

The product was then diluted to a non-volatile content of 50% with a 1:1 blend of xylene and propylene glycol monomethyl ether.

(e). Polyamine Preparation—Component (e)

A mixture of the diketimine formed by condensation of diethylene triamine and methylisobutylketone (363 g) and "Desmodur L" (a polyisocyanate from Bayer Chemicals Company) (387 g) were stirred at room temperature for about 45 minutes in a solvent blend consisting of methylisobutyl ketone (263 g), xylene (300 g) and ethyl acetate (129 g). When the reaction was complete, any free isocyanate groups remaining in the product were destroyed by the addition of n-butanol (100 g).

(f). Coating Compositions

The polyamine prepared in 1(e) above (17.75 g) was added to a paint pack (100 g) comprising pigments (TiO$_2$, BaSO$_4$, talc, an anticorrosive pigment and Fe$_2$O$_3$) and, to a pigment volume concentration (PVC) of 50%, unsaturated polyester prepared in 1(d) above (100 g). (This composition corresponds to an equi-molar ratio of amine groups to carbon-carbon double bonds). Two moles of different ketones per mole of amine groups were added at this stage as set out in the following table. The viscosity of the resulting composition was then adjusted to 18 to 20 seconds as measured in a B4 viscosity cup using a solvent mixture comprising butyl acetate, xylene and ethylene glycol diacetate at a ratio of 1.0:1.86:0.4.

| Example | Cyclic ketone (g) | B pt. °C. |
| --- | --- | --- |
| 1 | cyclopentanone | 130 |
| 2 | cyclohexanone | 155 |
| 3 | cycloheptanone | 179 |
| 4 | cyclo-octanone | 195 |
| 5 | 3-methylcyclohexanone | 168 |
| 6 | Sextone B* | ca. 170[10] |
| 7 | 4-methylcyclohexanone | 169 |
| 8 | 4-(t-butyl)-cyclohexanone | 47 |

*A mixture of cyclohexanone and methylcyclohexanones available from Bayer.

Examples A to D: Curing Rates and Hardness Tests

The compositions of Examples 1 to 8 were sprayed out under conventional conditions at 20° C. on to pretreated steel panels. The resulting films were tested for cure by rubbing with a methylethylketone soaked cloth and were tested for hardness using the Erichsen Pendulum Hardness meter.

The results of these tests were compared with those using different quantities and types of ketone, falling inside and out of the scope of the present invention, and are reported in the following tables. All compositions were made according to the method of Examples 1 to 8. The results fall into the following categories:

Table A: results using compositions of Examples 1 to 4 and Comparison with use of cyclobutanone.
Table B: comparative results using non-cyclic ketones and aldehydes.
Table C: results using compositions of Examples 5 to 8 and comparison with use of cyclic ketones substituted alpha to the carbonyl group.
Table D: results using different molar quantities of cyclohexanone.

Note that, throughout, the "standard" is a reference to a coating composition made without the addition of any aldehyde or ketone in place of component (g) or any component (g) according to the invention. MEK denotes the methylethylketone double rub test results after 2 or 4 hours and HD denotes the Erichsen Hardness test results after 2 or 4 hours. The MEK results are the number of per double rubs (i.e. one upward and one downward stroke on a test panel with a methylethylketone-soaked rag) required to first expose the substrate. The Erichsen results represent the number of swings registered by the Erichsen Hardness meter per test.

Example A: The Effect of Cyclic Ketones

In this study, commonly available cyclic ketones were used in the coating composition above with rings containing from 4 to 8 carbon atoms. The results are shown in Table A and the MEK rub resistance is shown graphically in FIG. 1. It can be seen from these results that 5- to 8-membered cyclic ketones show a marked positive effect upon both the development of MEK rub resistance and hardness, compared with the standard, whereas the 4-membered cyclic ketone does not.

Example B: Comparative Use of Non-Cyclic Aldehydes and Ketones

A number of different aldehydes and ketones outside the scope of the invention were used in the coating composition above.

They are listed in Table B from which it can be seen that these different ketones and aldehydes have widely varying boiling points ranging from 80° C. for methylethyl ketone to 178° C. for benzaldehyde. The results show that there was no significant difference between these compositions and the standard in terms of their MEK resistance at 2 or 4 hours or their hardness at 2 or 4 hours.

Example C: The Effect of Substituted Cyclohexanones

A variety of substituted cyclohexanones were added to the coating composition above to investigate their effects on the rates of cure. The results are shown in Table C and are graphically depicted in FIG. 2. It can be seen that those cyclohexanones with substituents in the 2 and 5 positions (alpha to the carbonyl) such as 2,5-dimethylcyclohexanone, 2-methylcyclohexanone and 2-(t butyl)cyclohexanone, and also that with a double bond conjugated to the carbonyl, cyclohexenone, show no enhanced properties over the standard, whereas the compositions of Examples 5 to 8 do.

Example D: The Effect of Varying Amounts of Cyclohexanone

The level of cyclohexanone in the coating composition was varied from 0.25–16 moles of ketone per mole of amine group in the composition, in order to study the effect upon cure and hardness.

The results are shown in Table D and graphically depicted in FIGS. 3, 4, 5 and 6; O/N depicts "overnight". It can be seen that an effect is observed even at low levels of cyclohexanone after 2 and 4 hours' cure.

Example 9: Use of Desmodur Z in Synthesis of Component (b)

The method of Examples 1 to 8 was followed but replacing the polyamine of step (e) with one prepared from Desmodur Z/diethylene triamine/methylisobutylketone. (i.e. replacing the use of Desmodur L in Examples 1 to 8 with Desmodur Z, an isocyanate prepolymer believed to be a trimer of diisophorone diisocyanate ex Bayer Chemicals Company).

Examples E to G: Curing Rates and Hardness Tests

Examples E and F

The compositions of Examples 9 and 10 were tested as described above in relation to Examples A to D.

Example G

A comparison was made between a composition wherein cyclohexanone had been used in the synthesis of the polyamine component (e) and the corresponding composition of Example 2.

The results of Examples E to G are shown in Table E where it can be seen that use of a cyclic ketone component (g) in the compositions of Examples 9 and 10 enhances the curing and hardening properties versus the corresponding standard, but that using cyclohexanone in the synthesis of component (e) does not give rise to statistically significantly enhanced properties, unlike those achieved by compositions according to the present invention.

TABLE A

| The Effect of Cyclic Ketones | | | | |
|---|---|---|---|---|
| Carbonyl | Bpt | MEK 2 hr | MEK 4 hr | HD 2 hr | HD 4 hr |
| Standard (cp) | 114 | 24 | 36 | 10 | 15 |
| Cyclobutanone (cp) | 99 | 11 | 13 | 14 | 18 |
| Cyclopentanone (Ex. 1) | 130 | 27 | 87 | 19 | 27 |
| Cyclohexanone (Ex. 2) | 155 | 64 | 90 | 15 | 19 |
| Cycloheptanone (Ex. 3) | 179 | 50 | 110 | 14 | 17 |
| Cyclo-octanone (Ex. 4) | 195 | 98 | 114 | 15 | 17 |

Figure 1:
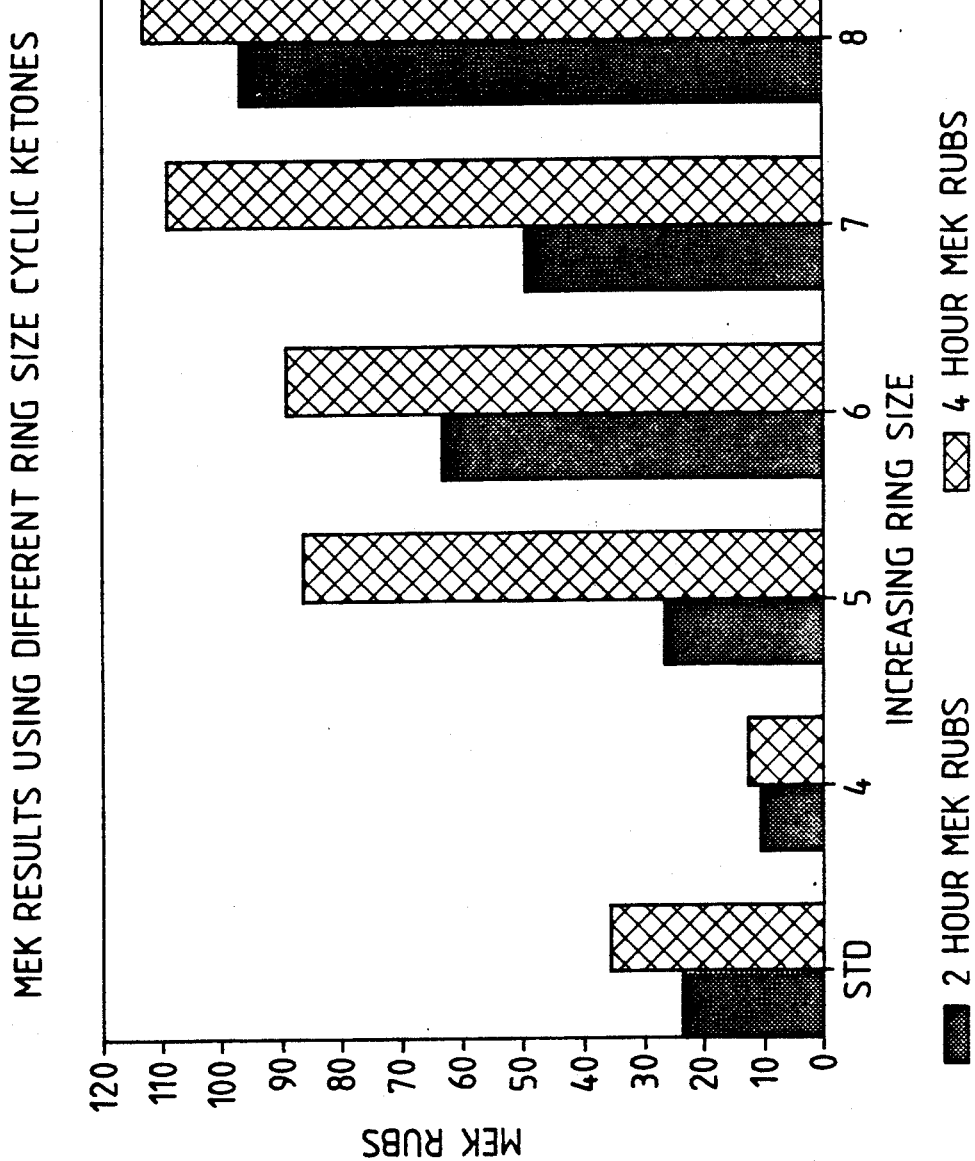
FIGS. 1-2 provide a graphical presentation of the MEK rub resistance of difference ketones included in compositions.

See FIG. 1 for a graphical representation of the MEK rub resistance

TABLE B

| Comparative use of Different Non-cyclic Ketones and Aldehydes | | | | | |
|---|---|---|---|---|---|
| Carbonyl | Bpt | MEK 2 hr | MEK 4 hr | HD 2 hr | HD 4 hr |
| Standard (cp) | 114 | 24 | 36 | 10 | 15 |
| Methylethyl Ketone | 80 | 16 | 13 | 14 | 15 |
| Pentanone-3 | 102 | 15 | 20 | 9 | 18 |
| Std + MIBK | 114 | 11 | 20 | 10 | 20 |
| Cyclopropylmethyl Ketone | 114 | 19 | 19 | 13 | 17 |
| Methyl amyl ketone | 127 | 14 | 29 | 15 | 17 |

TABLE B-continued

| Comparative use of Different Non-cyclic Ketones and Aldehydes | | | | | |
|---|---|---|---|---|---|
| Carbonyl | Bpt | MEK 2 hr | MEK 4 hr | HD 2 hr | HD 4 hr |
| Acetylactone | 133 | 16 | 20 | 13 | 15 |
| Acetaldehyde | 145 | 17 | 27 | 3 | 18 |
| Methoxyhexanone | 158 | 21 | 26 | 4 | 11 |
| Valeraldehyde | 103 | 19 | 23 | 9 | 13 |
| Ethylbutyraldhyde-2 | 117 | 14 | 15 | 5 | 7 |
| Hexanal | 131 | 16 | 20 | 15 | 14 |
| Cyclohexane Aldehyde | 162 | 12 | 17 | 6 | 9 |
| Benzaldehyde | 178 | 16 | 27 | 12 | 7 |

TABLE C

| Results for the use of Different Substituted Cyclohexanones | | | | | |
|---|---|---|---|---|---|
| Carbonyl | Bpt | MEK 2 hr | MEK 4 hr | HD 2 hr | HD 4 hr |
| 1 Standard (cp) | 114 | 24 | 36 | 10 | 15 |
| 2 Cyclohexanone | 155 | 64 | 90 | 15 | 19 |
| 3 2,5-Dimethyl Cyclohexanone | 174 | 28 | 27 | 9 | 12 |
| 4 2-Methylcyclohexanone | 168 | 13 | 18 | 12 | 15 |
| 5 2(-butyl)cyclohexanone | | 15 | 20 | 10 | 15 |
| 6 Cyclohexenone | 168 | 28 | 40 | 15 | 16 |
| 7 3-methylcyclohexanone (Example 5) | 168 | 55 | 130 | 12 | 14 |
| 8 Sextone B (Example 6) | 170 | 65 | 119 | 12 | 14 |
| 9 4-methylcyclohexanone (Example 7) | 169 | 58 | 140 | 14 | 15 |
| 10 4-t-butylcyclohexanone (Example 8) | 47 | 75 | 120 | 14 | 14 |

Figure 2:
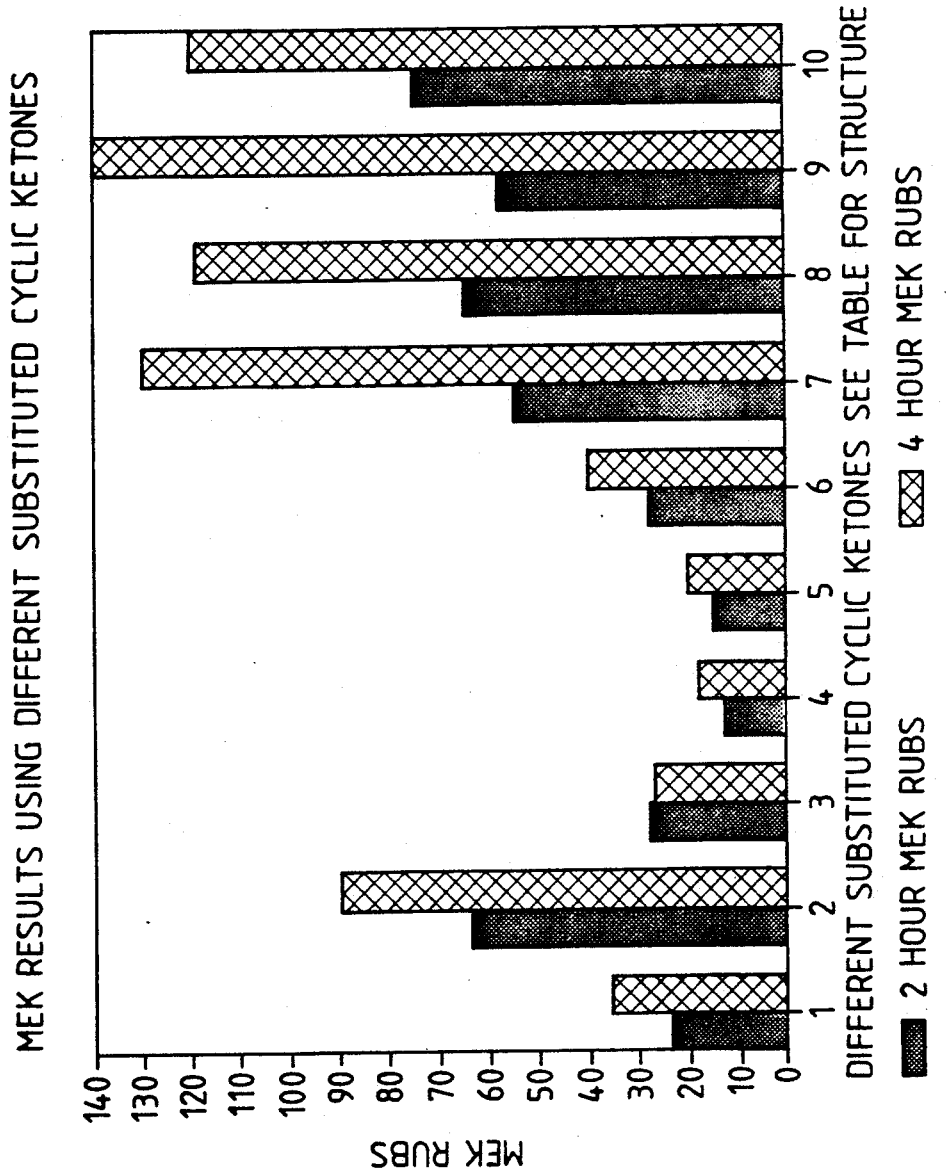

See FIG. 2 for a graphical presentation of the MEK rub results.

TABLE D

| Results for the Use of Different Molar Ratios of Cyclohexanone | | | | | | |
|---|---|---|---|---|---|---|
| Quantity | MEK | | | HD | | |
| (mole ratio) | 2 hr | 4 hr | O/N | O/N | 4 hr | 2 hr |
| Standard | 16 | 22 | 39 | 15 | 13 | 11 |
| 0.25 | 23 | 43 | 78 | 23 | 14 | 12 |
| 0.5 | 38 | 60 | 124 | 23 | 15 | 12 |
| 1.0 | 49 | 70 | 122 | 26 | 17 | 15 |
| 2.0 | 59 | 78 | 197 | 29 | 17 | 14 |
| 3.0 | 89 | 159 | 246 | 24 | 15 | 13 |
| 4.0 | 80 | 135 | 220 | 25 | 14 | 13 |
| 8.0 | 77 | 89 | 172 | 22 | 14 | 13 |
| 16.0 | 71 | 75 | 162 | 18 | 15 | 14 |

Figure 3:
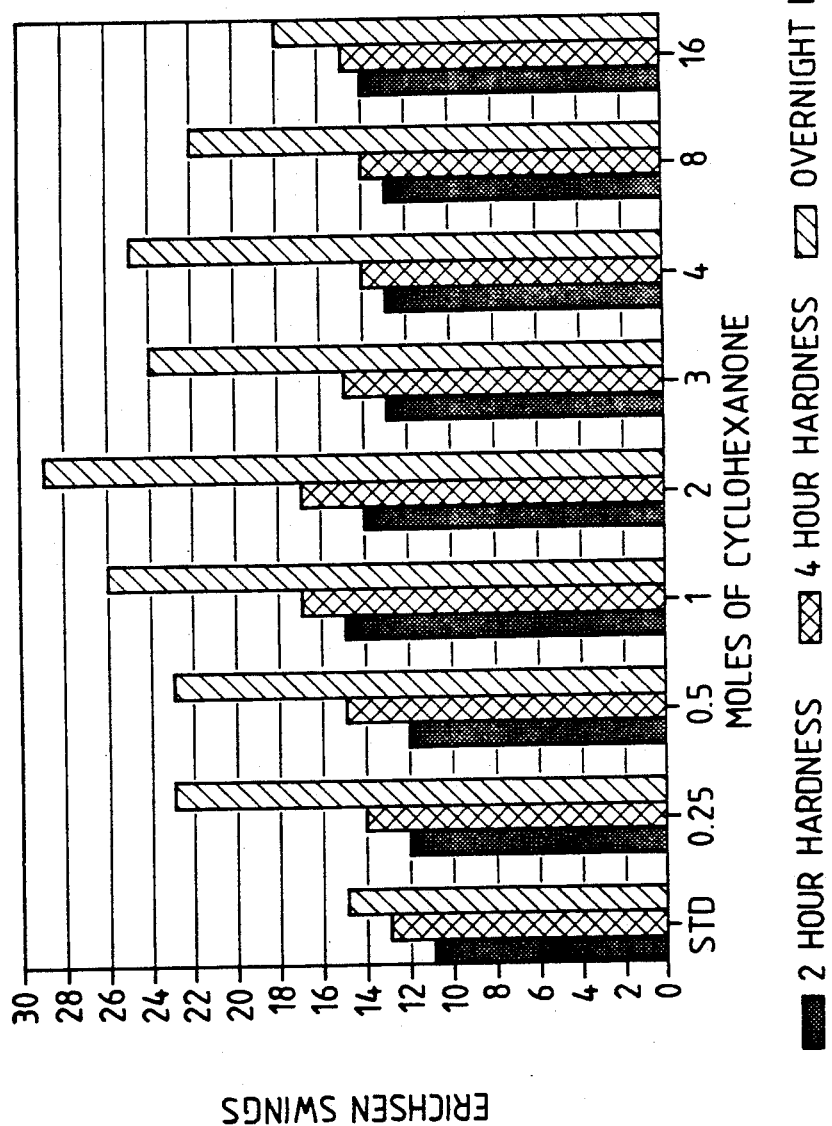
FIG. 3 provides a graphical presentation of the use of different molar ratios of cyclohexanone on hardness.
Figure 4:
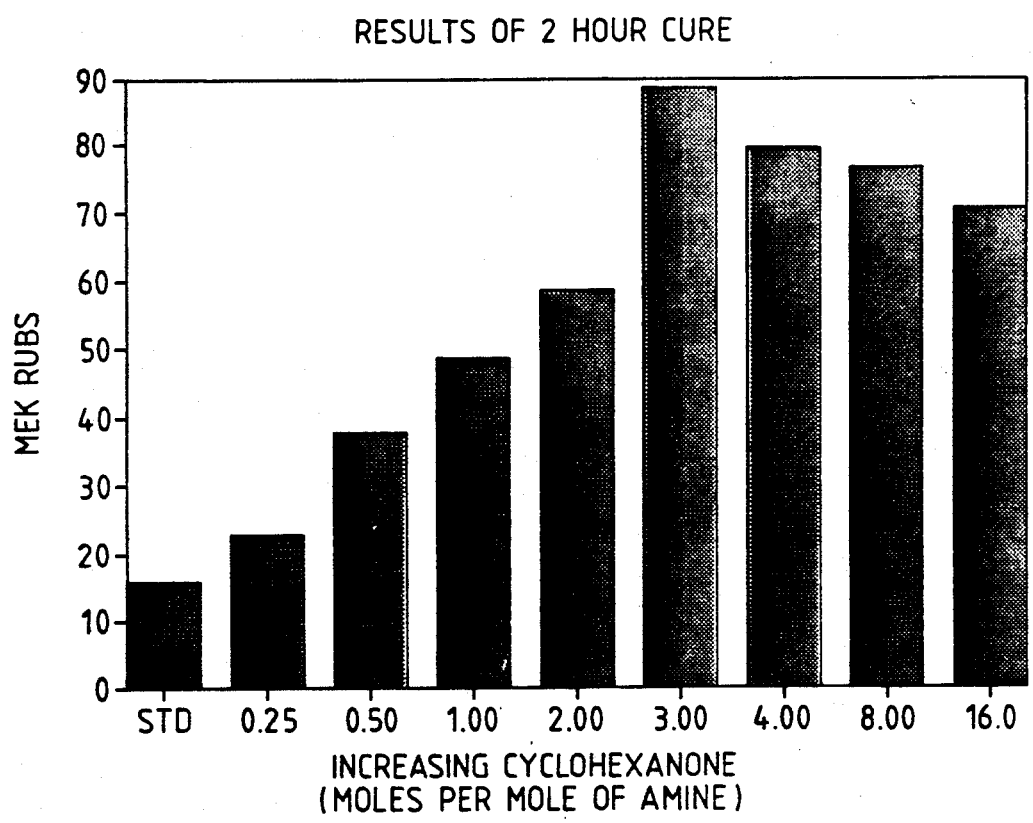
FIGS. 4-6 provide a graphical presentation of the hardness results obtained at varying times of curing.
Figure 5:
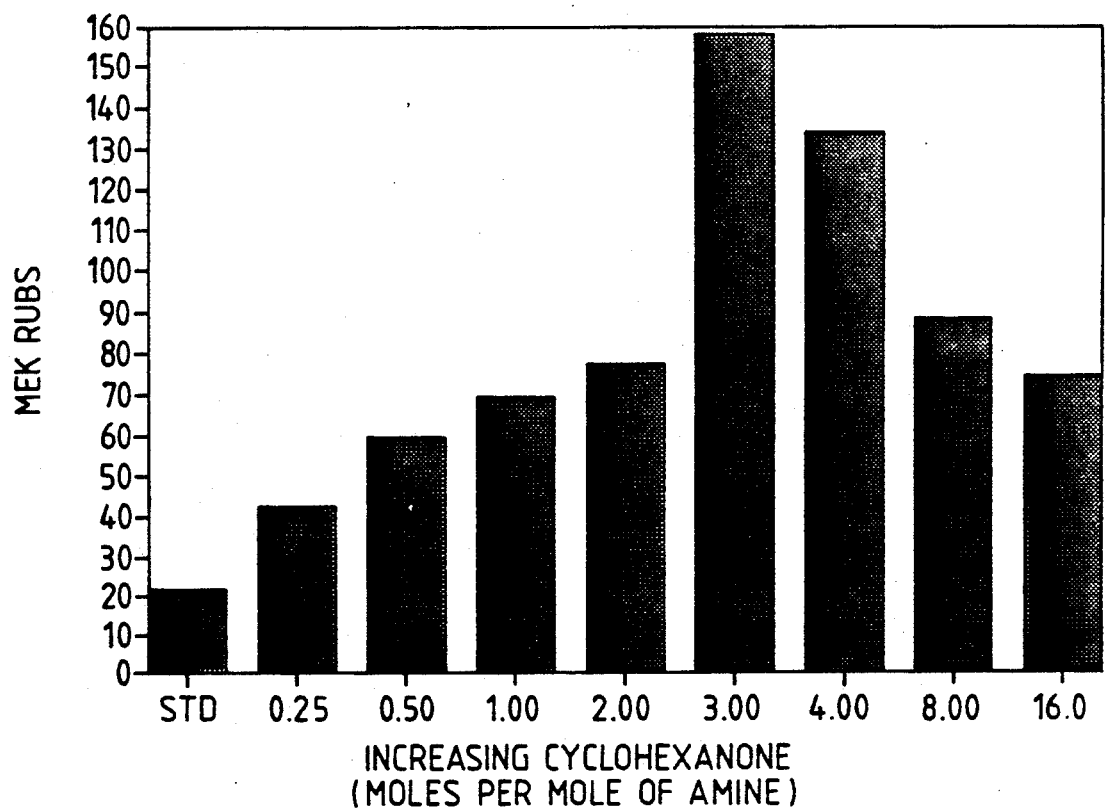
Figure 6:
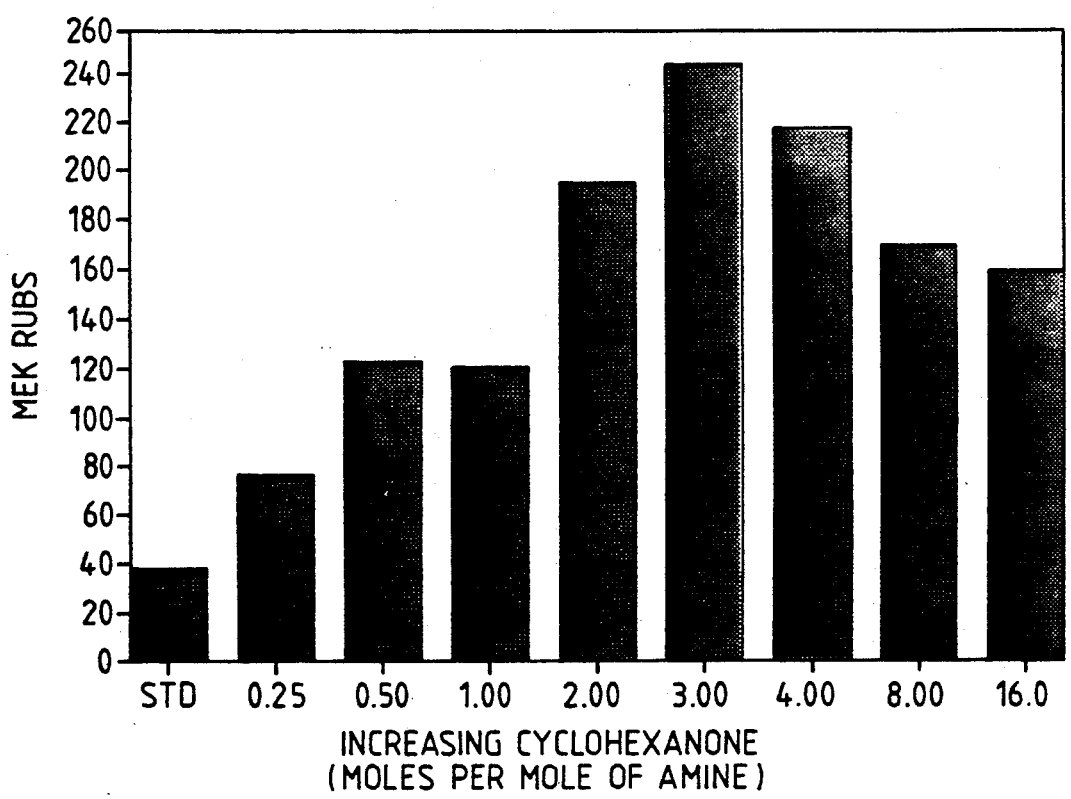

See FIG. 3 for a graphical presentation of the MEK rub results and FIGS. 4, 5 and 6 for graphical presentations of the hardness results.

TABLE E

| Results for different types of blocked amine component (e) with and without cyclohexenone (CyH) | | | | |
|---|---|---|---|---|
| | CyH Moles | 2 hr MEK | 4 hr MEK | 4 hr HD |
| Des L/DETA/MIAK | 0 | 30 | 33 | 16 |
| | 2 | 70 | 120 | 16 |
| Des Z/DETA/MIBK | 0 | 30 | 28 | 10 |
| | 2 | 71 | 150 | 15 |
| Des L/DETA/CyH (Cp) | 0.1 | 50 | 70 | 16 |

I claim:

1. A curable coating composition which comprises:
   (a) a condensation polymer in which the polymer backbone of each molecule on average contains at least on activated unsaturated grouping of the formula (1)

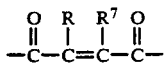

where R and R⁷, the same or different, are hydrogen, a halogen or an alkyl or aryl group:
(b) a compound containing at least three blocked primary amino groups, wherein the primary amino groups are in latent form capable of reverting to primary amino groups under curing conditions and reacting with activated unsaturated groups in formula (1);
(c) a cyclic ketone of formula (2)

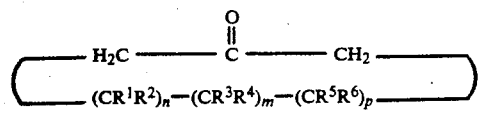

in which the sum of m, n and p is from 2-5 and $R^1$ to $R^6$ may be any groups which do not react with components (a) or (b).

2. A composition according to claim 1 wherein, $R^1$ to $R^6$ are hydrogen or $C_{1-6}$ alkyl.

3. A composition according to claim 2 wherein the cyclic ketone of formula (2) is cyclohexanone.

4. A composition according to claim 1 where the ketone of formula (2) is present in an amount in excess of 0.25 moles per mole of latent primary amino group from component (b).

5. A composition according to claim 1 where the unsaturated component (1) in (a) principally derives from maleic anhydride and the reaction product of bisphenol A with propylene oxide.

6. A composition according to claim 1 and comprising a pigment, thinner or filler.

7. A composition according to claim 1 in "two pack" form.

8. A curable coating composition which comprises:
(a) a condensation polymer in which the polymer backbone of each molecule on average contains at least one activated unsaturated grouping of the formula (1)

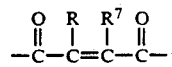

where R and R⁷, the same or different, are hydrogen, a halogen or an alkyl or aryl group:
(b) a compound containing at least three blocked primary amino groups, wherein the primary amino groups are in latent form
(c) a cyclic ketone of formula (2)

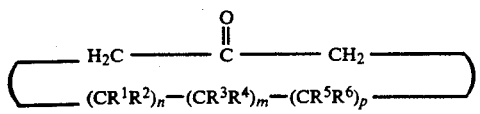

in which the sum of m, n and p is from 2.5 and $R^1$ to $R^6$ may be any groups which do not react with the other components; and
where component (b) is the adduct of the product of diethylene triamine and methylisobutyl or methylisoamyl ketone and a polyisocyanate.

9. A composition according to claim 1 where the blocked primary amino groups in component (b) are grouping of formula (4):

10. A composition according to claim 1 where the primary amino groups in component (b) are blocked by ketimine or aldeimine formation.

11. A composition according to claim 1 where the primary amino groups in component (b) are blocked with $C_{1-6}$ blocking agent selected from an alkanone or an aldehyde.

* * * * *